United States Patent
Pizano et al.

(10) Patent No.: US 9,021,468 B1
(45) Date of Patent: Apr. 28, 2015

(54) BUNDLING EXTENSION INSTALLATION WITH WEB BROWSER INSTALLATION

(75) Inventors: Carlos E. Pizano, Sunnyvale, CA (US); Erik Kay, Belmont, CA (US); Aaron Boodman, San Francisco, CA (US)

(73) Assignee: Google Inc., Mountain View, CA (US)

(*) Notice: Subject to any disclaimer, the term of this patent is extended or adjusted under 35 U.S.C. 154(b) by 715 days.

(21) Appl. No.: 13/110,894

(22) Filed: May 18, 2011

Related U.S. Application Data

(60) Provisional application No. 61/346,013, filed on May 18, 2010, provisional application No. 61/345,999, filed on May 18, 2010, provisional application No. 61/346,000, filed on May 18, 2010.

(51) Int. Cl.
*G06F 9/445* (2006.01)

(52) U.S. Cl.
CPC ........................................ *G06F 8/61* (2013.01)

(58) Field of Classification Search
CPC .................... G06F 8/60–8/70; G06F 9/45529; G06F 21/128
USPC ............ 717/174, 175, 176, 177, 178; 341/50, 341/51; 380/28, 29
See application file for complete search history.

(56) References Cited

U.S. PATENT DOCUMENTS

| | | | |
|---|---|---|---|
| 5,710,918 A * | 1/1998 | Lagarde et al. ........................ 1/1 |
| 6,282,711 B1 * | 8/2001 | Halpern et al. ............... 717/175 |
| 6,381,742 B2 * | 4/2002 | Forbes et al. ................. 717/176 |
| 6,546,554 B1 * | 4/2003 | Schmidt et al. ............... 717/176 |
| 6,675,382 B1 * | 1/2004 | Foster ........................... 717/177 |
| 7,895,296 B1 * | 2/2011 | Dayan ........................... 709/219 |
| 7,913,249 B1 * | 3/2011 | MacIntyre et al. ............ 717/174 |
| 8,060,485 B2 * | 11/2011 | Carro ............................ 707/705 |
| 8,316,387 B2 * | 11/2012 | Turski ........................... 719/330 |
| 8,448,161 B2 * | 5/2013 | Goldman ...................... 717/170 |
| 2001/0054143 A1 * | 12/2001 | Miyazawa et al. ............ 713/155 |
| 2002/0107693 A1 * | 8/2002 | Thomas ..................... 704/270.1 |
| 2003/0051066 A1 * | 3/2003 | Pace et al. ..................... 709/316 |

(Continued)

OTHER PUBLICATIONS

Co-Browsing Dynamic Web Pages—Dietwig Lowet, Daniel Goergen—Philips Research Laboratories—WWW 2009 Madrid! Track: Web Engineering / Session: Client Side Web Engineering—Apr. 20-24, 2009, Madrid, Spain.*

*Primary Examiner* — Lewis A Bullock, Jr.
*Assistant Examiner* — Francisco Aponte
(74) *Attorney, Agent, or Firm* — Brake Hughes Bellermann LLP

(57) ABSTRACT

According to one general aspect, a computer-implemented method may include receiving, at a server, a request from a computing device for an executable installation file. The executable installation file may be configured, when executed on the computing device, to install a web browser application on the computing device. The request may be associated with a specific network resource location that is hosted by the server. The method may include, in response to receiving the request, obtaining the executable installation file, dynamically incorporating a data file into the executable installation file. The data file may include a browser extension definition for a browser extension corresponding with the specific network resource location. The executable installation file, with the incorporated data file, may be further configured, when executed on the computing device, to install the defined browser extension on the computing device. The method may also include providing the executable installation file, with the incorporated data file, to the computing device.

21 Claims, 5 Drawing Sheets

(56) References Cited

U.S. PATENT DOCUMENTS

| | | | |
|---|---|---|---|
| 2004/0010574 A1* | 1/2004 | Cammick et al. | 709/222 |
| 2008/0184141 A1* | 7/2008 | Selig | 715/762 |
| 2008/0184148 A1* | 7/2008 | Selig | 715/769 |
| 2008/0184157 A1* | 7/2008 | Selig | 715/781 |
| 2008/0184158 A1* | 7/2008 | Selig | 715/781 |
| 2008/0184159 A1* | 7/2008 | Selig | 715/781 |
| 2009/0106557 A1* | 4/2009 | Leonard | 713/179 |
| 2009/0158043 A1* | 6/2009 | Boyer et al. | 713/176 |
| 2010/0121928 A1* | 5/2010 | Leonard | 709/206 |
| 2010/0199169 A1* | 8/2010 | Gnech et al. | 715/234 |
| 2010/0205618 A1* | 8/2010 | Gonzalez et al. | 719/328 |
| 2011/0145360 A1* | 6/2011 | Sheshagiri et al. | 709/217 |

* cited by examiner

BUNDLING EXTENSION INSTALLATION WITH WEB BROWSER INSTALLATION

CROSS REFERENCE TO RELATED APPLICATIONS

This application claims the benefit, under 35 U.S.C. §119, of U.S. Provisional Patent Application No. 61/345,999 (titled "Installable Web Applications"), U.S. Provisional Patent Application No. 61/346,000 (titled "Web Store for Digital Goods"), and U.S. Provisional Patent Application No. 61/346,013 (titled, "Chrome Extensions"), all filed May 18, 2010. The disclosures of these provisional patent applications are incorporated herein by reference in their entirety.

TECHNICAL FIELD

This application relates, in general, to bundling installation of web browser extensions with installation of a web browser.

BACKGROUND

Use of the World Wide Web continues to increase, as does the amount and variety of content that is available to its users. Users of the World Wide Web commonly use browsers (web browsers) implemented on a web-enabled computing device to access content. Such devices include personal computers, laptop computers, netbook computers, smartphones and cell phones, among a number of other possible devices. Such web browsers are configured to read programmatic code and render that code as web pages, which may include rendering both audio and visual content contained in various media files (e.g., image, video and audio files), as well as performing other functions defined in the programmatic code. Web pages are generally implemented using standard programming languages such as HTML, HTML5, CSS and JavaScript, among a number of other available programming languages.

Some browsers allow users to install add-ons (or extensions) to the browser, where such extensions add functionality to the browser and operate as an integrated part of the browser. For instance, an extension may provide a user access to its additional functionality by modifying a user-interface (UI) of the browser. As an example, a weather forecast extension may be added to a browser, where the extension provides easy access to weather information by adding an icon or a button to the UI of the browser. A user may then interact with the extension's button or icon (e.g., by clicking it or hovering over it with a pointing device) to obtain weather information, rather than having to browse to a weather related web page in order to obtain weather information. Computing device users can obtain a wide variety of browser extensions from a number of sources. For instance, computer users may obtain extensions from a web store, the developer's website, or a number of other possible sources.

In some instances, an extension developer may wish to bundle one or more extensions with a web browser application installation program. Currently, such bundling is accomplished by using a custom installer, where the custom installer includes a copy of the browser application and each bundled extension. In such approaches, when the custom installer is executed by a computing system, the custom installer installs the included web browser application and extensions. Such approaches, however, have certain drawbacks. For instance, each time an update to the browser, or to any of the extensions bundled in the custom installer is released, the custom installer must be updated to include the most recent version of the browser and/or extensions. Such an approach may be costly and time-consuming.

SUMMARY

According to one general aspect, a computer-implemented method may include receiving, at a server, a request from a computing device for an executable installation file. The executable installation file may be configured, when executed on the computing device, to install a web browser application on the computing device. The request may be associated with a specific network resource location that is hosted by the server. The method may include, in response to receiving the request, obtaining the executable installation file, and dynamically incorporating a data file into the executable installation file. The data file may include a browser extension definition for a browser extension corresponding with the specific network resource location. The executable installation file, with the incorporated data file, may be further configured, when executed on the computing device, to install the defined browser extension on the computing device. If a digital signature is appended to, or otherwise included with the executable installation file, the data file may be incorporate in a portion of the executable data file that does is not used in generating the digital signature. The method may also include providing the executable installation file, with the incorporated data file, to the computing device.

According to another general aspect, a recordable storage medium having recorded and stored thereon instructions that, when executed by a first computing device, cause the first computing device to receive, at the first computing device, a request from a second computing device for an executable installation file. The executable installation file may be configured, when executed on the second computing device, to install a web browser application on the second computing device. The request may be associated with a specific network resource location that is hosted by the first computing device. The instructions may cause the computing device to, in response to receiving the request, obtain the executable installation file, dynamically incorporate a data file into the executable installation file, the data file including a browser extension definition for a browser extension corresponding with the specific network resource location, wherein the executable installation file, with the incorporated data file, is further configured, when executed on the second computing device, to install the defined browser extension on the second computing device, and provide the executable installation file, with the incorporated data file, to the second computing device.

According to another general aspect, an apparatus may include a processor, and a non-transitory recordable storage medium having instructions recorded thereon. The apparatus may be configured, as result of executing the instructions, to receive a request from a computing device for an executable installation file. The executable installation file may be configured, when executed on the computing device, to install a web browser application on the computing device. The request may be associated with a specific network resource location that is hosted by the server. The apparatus may be configured to, in response to receiving the request, obtain the executable installation file, dynamically incorporate a data file into the executable installation file, the data file including a browser extension definition for a browser extension corresponding with the specific network resource location, wherein the executable installation file, with the incorporated data file, is further configured, when executed on the computing device, to install the defined browser extension on the computing device, and provide the executable installation file, with the incorporated data file, to the computing device.

The details of one or more implementations are set forth in the accompanying drawings and the description below. Other features will be apparent from the description and drawings, and from the claims.

A system and/or method for bundling installation of web browser extensions with installation of a web browser, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
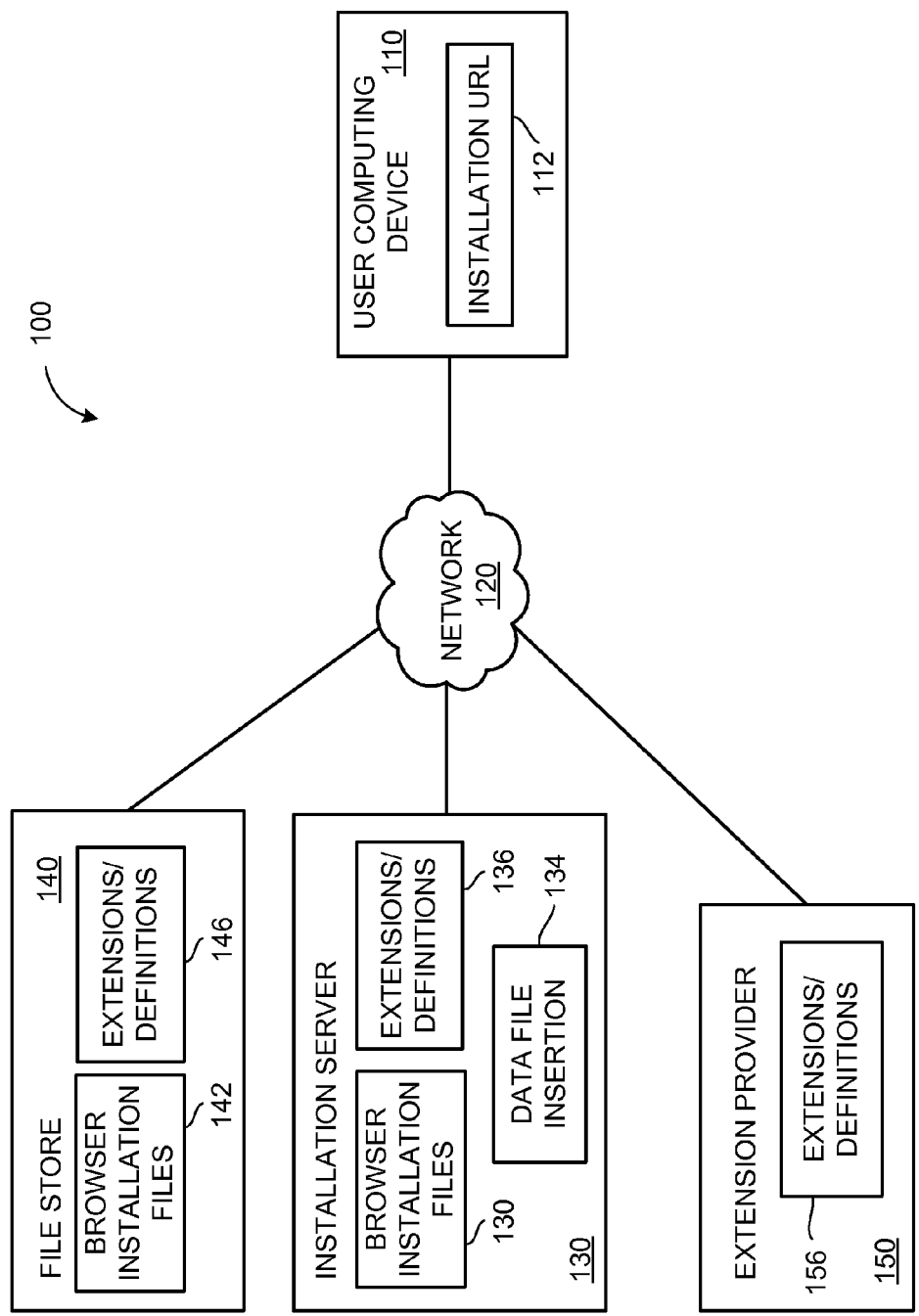
FIG. 1 is a block diagram illustrating a computing network in accordance with an example embodiment.

FIG. 1 is a block diagram illustrating a computing network 100 in accordance with an example embodiment. The network 100 of FIG. 1 includes a user computing device 110, which may take a number of forms, such as those described below with respect to FIG. 5. As shown in FIG. 1, as part of an example embodiment for bundling installation of one or more browser extensions with installation of a web browser, the computing device 110 may present an installation Uniform Resource Locator (URL) 112 to a user of the computing device 110.

The installation URL 112 may be presented to the user in a number of fashions. For example, the installation URL 112 may be presented to the user as part of an initial setup procedure for the computing device 110, where that procedure is installed on the computing device 110 by a manufacturer the computing device 110 during the manufacturing process. The installation URL 112 may, in another embodiment, be presented to the user by an extension developer, such as on a developer's website, or in some other manner. It will be appreciated that the installation URL 112 may be presented in other fashions, and may be provided from a number of other sources.

In one embodiment of the network 100, the installation URL 112 may be included in, or associated with a hyperlink, where following (clicking) the hyperlink initiates installation of a web browser program, such as using the techniques described herein. In response to a user clicking/following a link that includes, or is associated with the installation URL 112, the computing device 110 may send a request, via a network 120 (e.g., the Internet or World Wide Web) to an installation server 130 to obtain an executable browser installation file, where the installation file that is provided by the installation server 130 in response to the request includes a dynamically incorporated data file that includes information for bundled browser extension, as is described herein.

In an example embodiment, the data file includes definitions for one or more extensions that are to be bundled (installed at the same time) with the browser installation. In this example, the installation server 130 may include (host) a specific network resource that corresponds with the installation URL 112. Using the techniques described herein, implementing such an approach allows for bundling installation of the most recent versions of specific browser extensions (e.g., that correspond with the installation URL 112) with installation of a most recent version of a web browser, without the need for a custom installer, thus avoiding at least some of the drawbacks discussed above.

As shown in FIG. 1, the installation server 130 may include browser installation files 132, a data file insertion module 134 and browser extensions 136. As discussed herein, the data file insertion module 134 (in response to the installation server 130 receiving a request resulting from a user accessing the installation URL 112) may be configured to obtain an executable browser installation file from the browser installation files 132. The obtained executable file may, for example, comprise a most recently released version of a web browser application. The data file insertion module 134 may also be configured, based on the installation URL 112, to dynamically incorporate a data file into the obtained executable installation file, where the data file includes definitions of one or more extensions that are to be bundled (e.g., installed at the same time) with installation of the web browser. In one embodiment, the installation server 130 may host a number of installation URLs, where each installation URL corresponds with a respective set of one or more extensions that are to be bundled with a web browser installation.

In an example embodiment, dynamically incorporating a data file into the executable browser installation file may include obtaining definitions for the most current versions of the browser extensions that are to be bundled (based on the installation URL 112) with the web browser installation. In the network 100, the definitions may be obtained from a repository of browser extensions and definitions 136 that is included on the installation server 130. The data file insertion module 134 may then include the obtained definitions in the dynamically incorporated data file, such as using the techniques described herein, or using any other appropriate technique. In one example embodiment, the data file insertion module 130 may dynamically incorporate, in lieu of, or in addition to the respective browser extension definition(s), executable installation files for the most recent version of each of the respective browser extensions that are being bundled with the web browser install, which may also be obtained from the extensions/definitions repository 136 of the installation server.

In other embodiments, the installation server 130 may obtain the executable browser installation file, the extension definitions and/or the extension installation files from another location. For instance, in the example of FIG. 1, the installation server 130 may obtain executable browser installation files from a browser installation file repository 142 included on a file storage server (file store) 140. Likewise, the installation server 130 may obtain the browser extensions definitions and/or browser extension installation files from an extensions/definitions repository 146 on the file store 140. As another alternative, the installation server 130 may obtain the browser extensions definitions and/or browser extension installation files from an extensions/definitions repository 156 on an extension provider server 150. The extension provider server 150 may be, for instance, a server that is maintained by a developer of an extension that is to be bundled with a browser installation.

In one embodiment, the extension provider server 150 may be a server that is maintained by a manufacturer of the computing device 110. In such an embodiment, the installation URL 112 may initiate a request for installation of a web browser application that is bundled with a Customer Support browser extension, which may provide a user of the computing device 110 with easier access to support services of the manufacturer. In response to receiving such a request, the installation server 130 may obtain an executable browser installation file (e.g., from the browser installation files 132 or the browser installation files 142) and a definition of the support extension from the extension/definitions 156 on the extension provider server 150. The installation server 130, using the data file insertion module 134, may then incorporate a data file that includes the obtained extension definition in the obtained executable browser installation file. Once the data file is incorporated, the installation server 130 may then provide the executable installation file with the incorporated data file to the computing device 110. In this example, the provided file, when executed on the computing device 110, would install the web browser application and also install the Customer Support browser extension.

Figure 2:
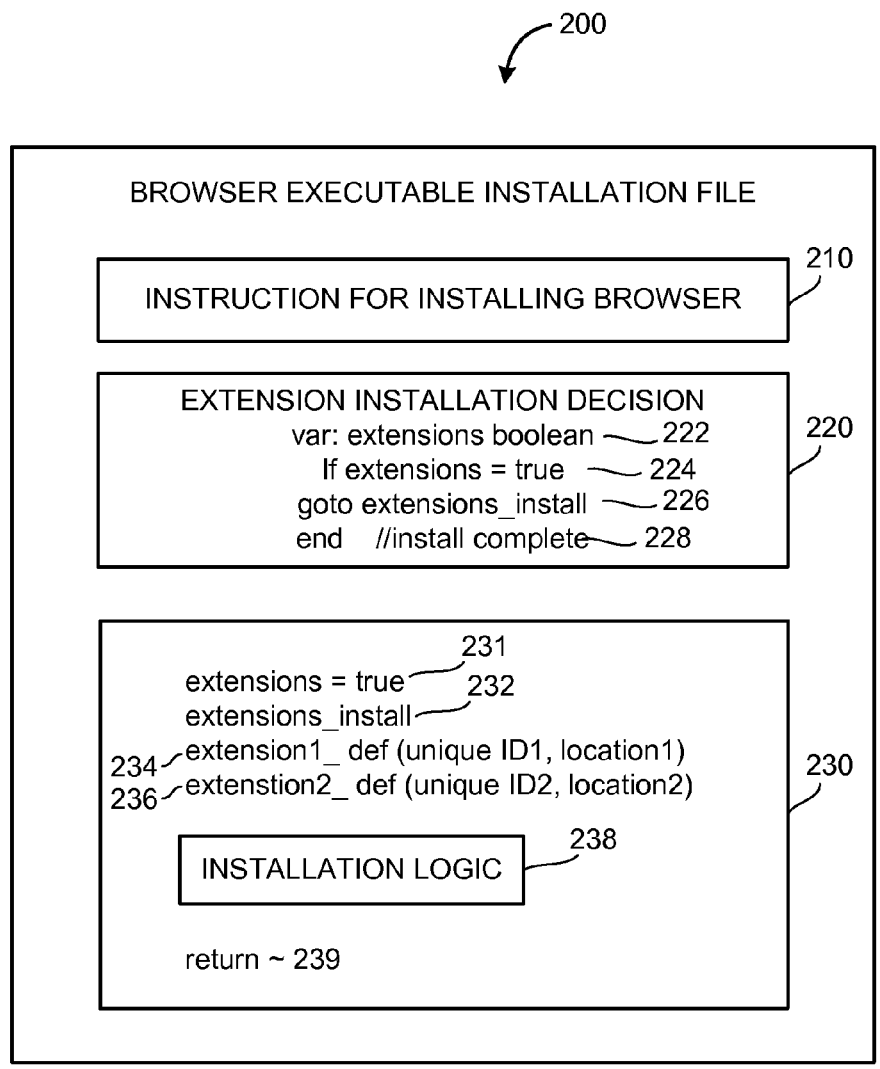
FIG. 2 is a diagram illustrating an executable web browser installation file in accordance with an example embodiment.

FIG. 2 is a diagram illustrating an executable browser installation file 200 in accordance with an example embodiment. The installation file 200 is provided by way of example and for purposes of illustration. It will be appreciated that a number of approaches may be used for incorporating a data file that includes information for browser extensions that are to be installed (bundled) along with a web browser installation into a common executable installation file. The installation file 200 may be used in the network 100 shown in FIG. 1. Accordingly, the installation file 200 will be described with further reference to FIG. 1. It will be appreciated, however, that the installation file 200 may be used in other network configurations.

As shown in FIG. 2, the installation file 200 includes instructions for installing a browser (instructions) 210 and an extension installation decision module (decision module) 220. In an example embodiment, an executable browser installation file that is obtained from one of the browser installation file repositories 132 and 142 may include the instructions 210 and decision module 220. As is shown in FIG. 2, the decision module 220 defines a Boolean variable "extensions" 222 and includes a conditional statement 224 based on the extensions variable 222. As shown in FIG. 2, if extensions is "true", a call to an extension_install procedure 232 is made. The procedure 232, in this example, may be included in the data file (e.g., a data file 230) that is dynamically incorporated into an executable browser installation file, which may initially include the instructions 210 and the decision module 220, as was discussed above.

In an example embodiment, the extensions variable 222 may have a default value of "false." In such an approach, if the value of the extensions variable 222 is not changed to "true", such as by an instruction 231 included in the dynamically included data file 230, the conditional statement 224 would be "false" and a call to the procedure 232 would not be made. However, as in this example, if the value of the extensions variable 222 is changed to "true", e.g., by dynamically incorporating the instruction 231 into an executable browser installation file, the conditional statement 234 would be evaluated as true, and the extensions install procedure 232 would be called.

In this example, the procedure 232 of the dynamically incorporated data file 230 includes a first extension definition, extension1_def 234. The definition 234 includes a unique ID1 and a location1 for the extension of definition 234. In an example embodiment, the unique ID may be a unique ID that is produced using the techniques described herein. The location1 for the definition 234 may be a URL at which an installation file (or installation package) for the extension may be obtained. As shown in FIG. 2, the file 230 includes a second extension definition, extension2_def 236, which is in substantially the same form as the definition 234.

In this example, the dynamically incorporated data file 230 further includes installation logic 238, which may include instructions that complete the installation of the bundled extensions based on the included extension definitions 234 and 236. While this example describes bundling two browser extensions with an installation of a web browser, in other embodiments fewer or more extensions may be bundled with the installation.

Once the installation logic 238 has completed, the data file 239 includes a return statement, which returns execution of the browser installation back to the instruction following the call 226 to the extension_install procedure 232, which, in this implementation, is an end instruction that indicates installation of extensions (e.g., by the data file 239) is complete. Accordingly, in this example, the installation of the browser application and the bundled extensions would be complete, and the executable file 200 would end execution.

In the example shown in FIG. 2 the unique IDs included in the browser extension definitions 234 and 236 may be generated using a number of techniques. As described above, in one embodiment, a web browser extension may be assigned a substantially globally unique identifier (UID or GUID). In various embodiments, the browser extension may be assigned or associated with a public/private encryption key pair. In one illustrative embodiment, the public/private encryption key pair may include two 1024 bit encryption keys. In such an embodiment, the private encryption key may be kept secret to only one or a few entities. For example, in various embodiments, the private encryption key may be only known to both the browser extension developer and the proprietor of the web browser extension store, as described above. Conversely, the public encryption key may be widely or publicly known.

In such an embodiment, one of the encryption keys (e.g., the public encryption key) may be used to produce a hash value that is substantially globally unique. In this context, a "cryptographic hash function" may include a deterministic procedure that takes an arbitrary block of data (e.g., the public encryption key, etc.) and returns a fixed-size bit string, the hash value, such that an accidental or intentional change to the data will change the hash value. In a preferred embodiment, the cryptographic hash function used to produce the hash value may include the Secure Hash Algorithm-Two-Fifty-Six (SHA-256) hash function developed by the United States' National Security Agency (NSA). In such an embodiment, the public/private encryption key pair may include a Rivest, Shamir and Adleman (RSA) public/private encryption key pair. It is understood that the above is merely one illustrative example to which the disclosed subject matter is not limited.

In one such embodiment, by generating the hash value from the public key, it may be possible for anyone who knows the public encryption key to generate the hash value. Therefore, the hash value may be widely known or derivable. Further, depending upon the hash function, the hash value may be sufficiently or substantially unique in that no two pieces of starting data (i.e., public keys, etc.) are statistically likely to produce the same resultant hash values. In such an embodiment, the hash value may be thought of as substantially globally unique.

In one embodiment, this hash value may be fairly large. While this may not be undesirable for authentication and signature purposes, as described above, the hash value may be too large to be desirable for identification purposes. However, as computing resources (e.g., memory, processing power, bandwidth, etc.) increase it is understood the desirable length of an identifier (ID) may also increase.

In such an embodiment, the GUID may be derived from the larger hash value. In one embodiment, the GUID may include just the first 128-bits or 32 characters, hex-encoded of the resultant hash value. It is understood that the above is merely one illustrative example to which the disclosed subject matter is not limited.

In some embodiments, this may result in a hex-encoded GUID. In various embodiments, it may be desirable to encode the GUID using another encoding scheme. In one specific illustrative embodiment, hex-encoding may be used for a variety of purposes on the computing device or within the context of the web browser. For example, Internet Protocol version 6 (IPv6) network addresses are generally 128-bit addresses encoded as 32 hex characters. Therefore, it is conceivable that in some embodiments, a web browser may confuse a 32 hex-character IPv6 address with a 32 hex-character browser extension GUID. This may be more likely in embodiments in which the GUID is employed in a Universal Resource Locator (URL), as described above. In such an embodiment, the GUID may be re-encoded via a scheme that would not be confused with an IPv6 network address. However, it is understood that the motivations for selecting an encoding scheme for the GUID is not limited to this illustrative example.

In various embodiments, the GUID may be encoding using a scheme that does not include or employ numeric (i.e., the numbers 0-9) values. In one embodiment, this may include converting the hex characters 0-F to the alphabetic characters A-P. In such an embodiment, a simple 1-to-1 mapping may be used in which the hex character 0 becomes the alphabetic character A; the hex character 1 becomes the alphabetic character B; the hex character 3 becomes the alphabetic character C; and so forth. In such an embodiment, the hex-encoded value "01:01:23:51:CD:71:A6:14:8B:AF:D7:65:02:31:BA: 35" may become the alphabetic encoded value "ab:ab:cd:fb: mn:hb:kg:be:il:kp:nh:gf:ac:db:lk:df". In various embodiments, this encoding scheme may be referred to as "mpdecimal", although mpdecimal may not include the colons (:) separating the encoded bits into octets. It is understood that the above is merely one illustrative example to which the disclosed subject matter is not limited.

Figure 3:
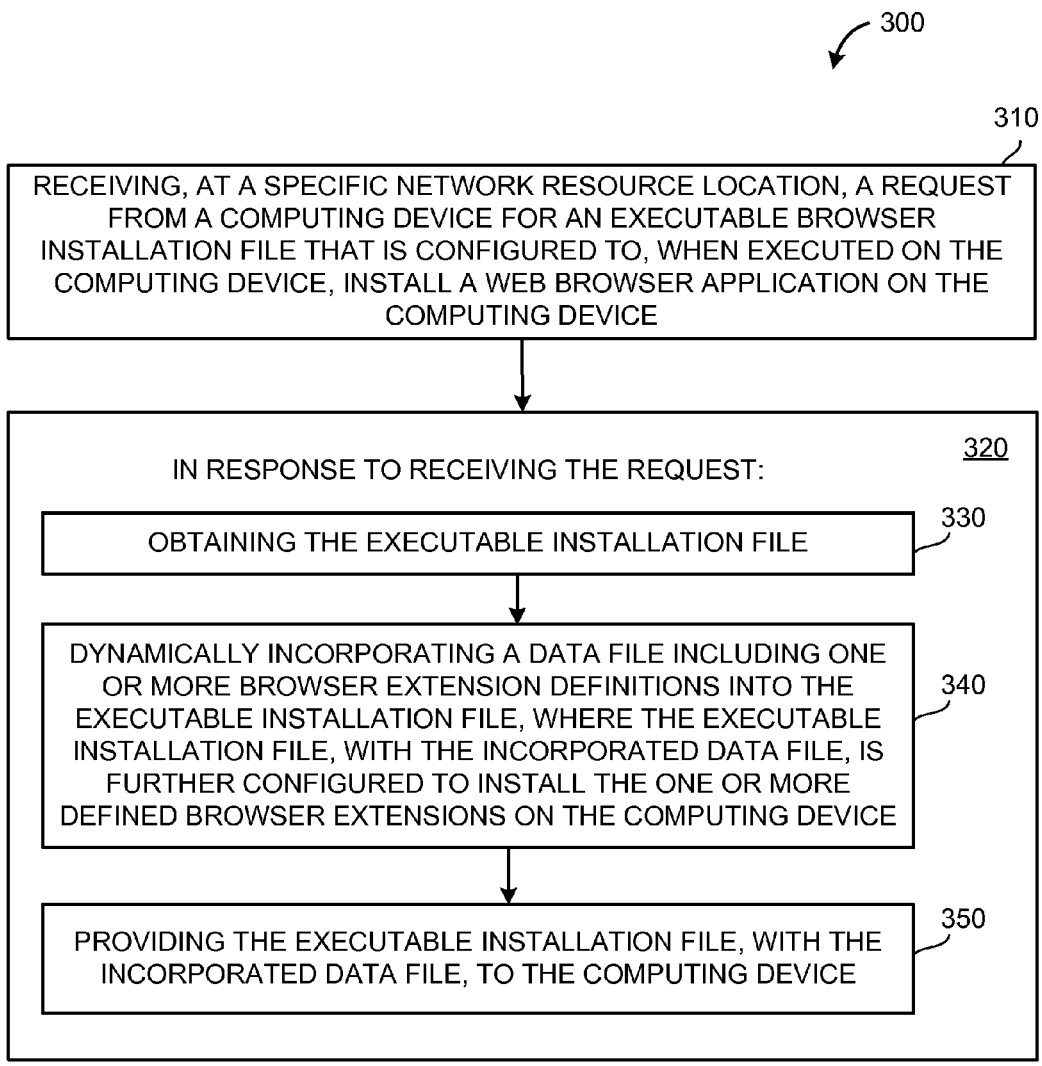
FIG. 3 is a flowchart illustrating a method for bundling extension installations with a web browser installation in accordance with an example embodiment.

FIG. 3 is a flowchart illustrating a method 300 for bundling extension installations with a web browser installation in accordance with an example embodiment. The method 300 may be implemented in the network 100 shown in FIG. 1, as well as with using the executable installation file 200 shown in FIG. 2. Accordingly, for purposes of illustration, FIG. 3 will be described with further reference to FIGS. 1 and 2, as appropriate. It will be appreciated, however, that other configurations and techniques may be used to implement the method 300.

At block 310, the method 300 includes receiving, at the installation server 130, a request from the computing device 110 for an executable installation file (e.g., including the instructions 210 and decision module 220). As discussed herein, the executable installation file at block 210 may be an executable web browser installation file that is configured to, when executed on the computing device 110, install a web browser application on the computing device 110. As discussed above with respect to FIG. 1, the request of block 210 may be associated with a specific network resource location (e.g., a specific URL) that is hosted by the server (e.g., the installation server 130).

The method 300 includes, at block 320, in response to receiving the request, at block 330, obtaining the executable installation file, such as from one of the browser installation file repositories 132 or 142. At block 340, the method 300 includes dynamically incorporating a data file, such as the data file 230, into the executable installation file obtained at block 330. As discussed above, incorporating the data file at block 340 may be accomplished using the data file insertion module 134 shown in, and described above with respect to FIG. 1.

In the method 300, the data file of block 340 includes a definition of a browser extension that corresponds with, e.g., the installation URL 112. In this embodiment, the specific network resource location associated with the installation URL may indicate to the installation server 130 a browser extension (or list of browser extensions) that are to be bundled with a browser installation. As discussed above with respect to the FIG. 2, the executable browser installation file, with the incorporated data file, (e.g., file 200) may be further configured, when executed on the computing device, to install the defined browser extension (or extensions) on the computing device, such as using installation logic 238.

In one embodiment, the executable installation file obtained at block 330 may include a digital signature that is included in the file, appended to the file, or otherwise included therewith. In such an approach, the digital signature may be based on a portion of the obtained file, not the entire file. In such instances, the data file incorporated at block 340 may be incorporated in a portion of the file that is not used in generating the digital signature. Such an approach would not affect the digital signature and, therefore, not impact signature verification for the executable file, even after incorporation of the data file at block 340.

The method 300 further includes, at block 350, providing the executable installation file, with the incorporated data file, (e.g., the file 200) to the computing device 110. As was discussed above, more than one browser extension definition may be included, at block 340, in the dynamically incorporated data file (e.g., data file 230). When the executable file is executed on the computing device 110, in this example, it results in the most recent version of the web browser and the most recent version of the bundled browser extensions being installed on the computing device 110.

Figure 4:
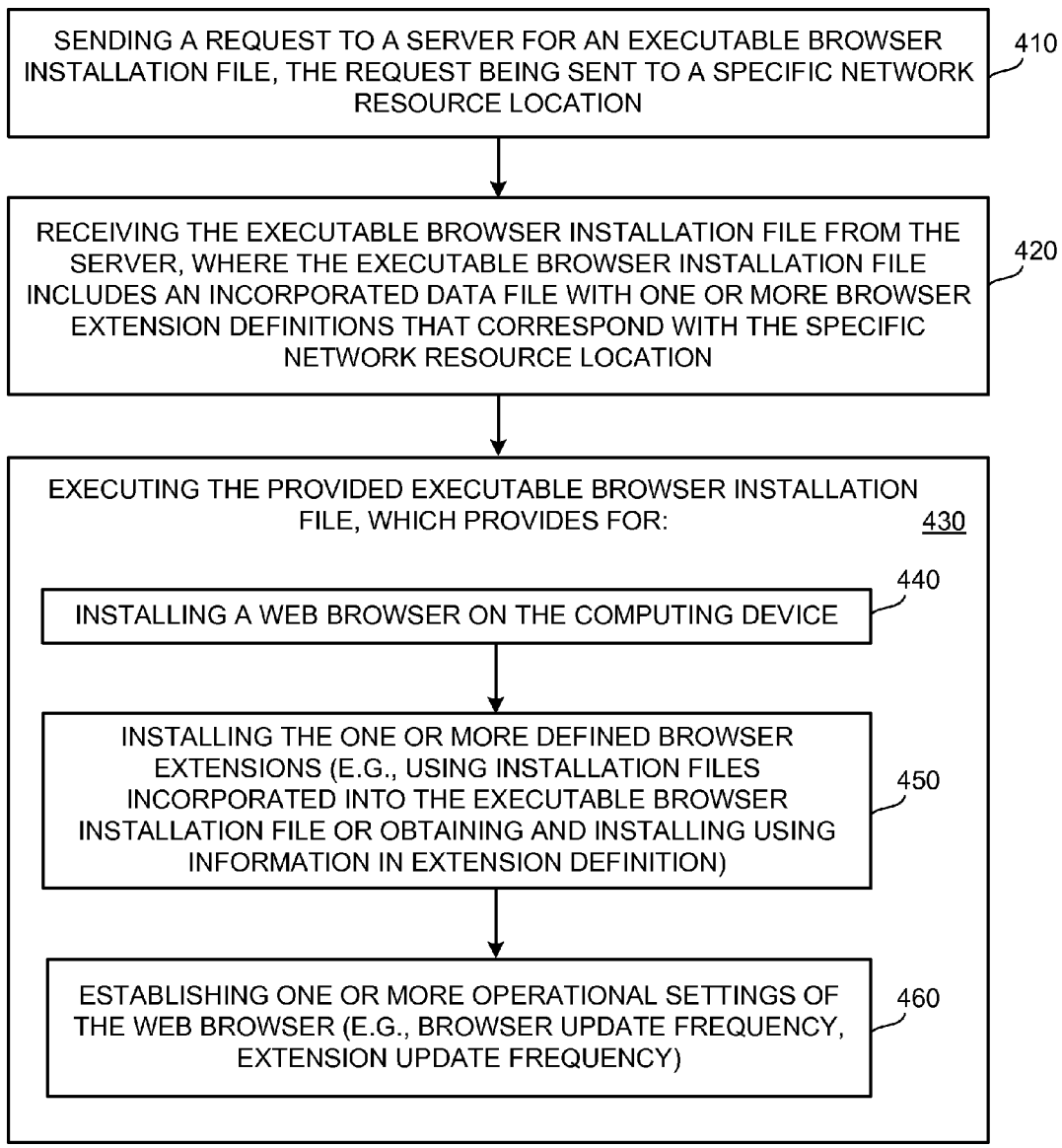
FIG. 4 is a flowchart illustrating a method for bundling extension installations with a web browser installation in accordance with an example embodiment.

FIG. 4 is a flowchart illustrating a method 400 for bundling installation of browser extensions with a web browser installation in accordance with an example embodiment. As with the method 300, the method 400 may be implemented in the network 100 shown in FIG. 1, as well as with using the executable installation file 200 shown in FIG. 2. Accordingly, for purposes of illustration, FIG. 4 will be described with further reference to FIGS. 1 and 2, as appropriate. It will be appreciated, however, that other configurations and techniques may be used to implement the method 400.

The method 400 includes, at block 410, sending a request to a server (e.g., the installation server 130) for an executable web browser installation file that bundles installation of one or more extensions for the web browser. As discussed herein, the request of block 410 may be generated by a user of the computing device 110 following the installation URL 112. At block 420, the method 400 includes receiving the executable installation file requested at block 410. For instance, the file received at block 420 may take the form of the executable installation file 200 shown in FIG. 2. In other embodiments, the file received at block 420 may take other forms.

At block 430, the method 400 includes executing the executable installation file received at block 420. In the method 400, executing the file of block 430 on the computing device 110 includes, at block 440, installing a web browser on the computing device 110. Executing the file at block 430 further includes, at block 450, installing browser extension(s) defined or included in the file received at block 420 on the computing device 110, such as by using the techniques described herein. Executing the file at block 430 further includes, at block 460, establishing one or more operational settings of the web browser. For instance, the method 400, at block 460, may include setting one or more user preferences of the installed web browser. For example, respective update frequencies for the browser and the bundled extensions that were installed may be set. Based on these user settings, the browser may periodically check for and install updates to the browser application and/or the bundled extensions in accordance with the respective update frequencies.

Figure 5:
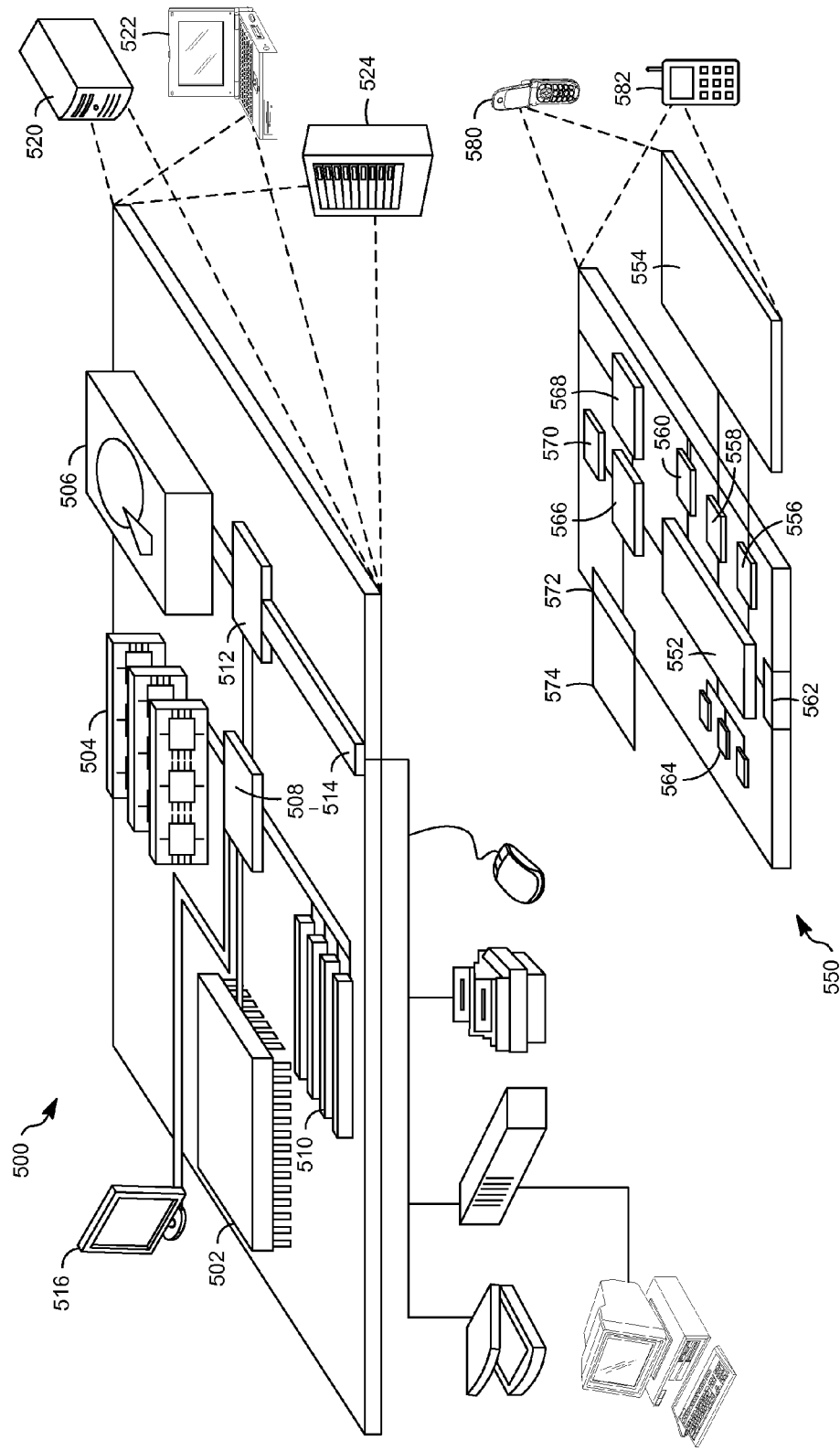
FIG. 5 is a diagram illustrating a computing device and a mobile computing device that can be used to implement the techniques described herein in accordance with an example embodiment.

FIG. 5 is a diagram that shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/ or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, at a server, a request from a computing device for an executable installation file, the executable installation file being configured, when executed on the computing device, to install a web browser on the computing device, the request being associated with a specific network resource location that is hosted by the server; and in response to receiving the request:
  obtaining the executable installation file;
  dynamically incorporating a data file into the executable installation file, the data file including a browser extension definition for a browser extension corresponding with the specific network resource location, wherein the executable installation file, with the incorporated data file, is further configured, when executed on the computing device, to install the defined browser extension on the computing device; and
  providing the executable installation file, with the incorporated data file, to the computing device.

2. The computer-implemented method of claim 1, wherein:
the obtained executable installation file includes a digital signature corresponding with a first portion of the obtained executable installation file, the obtained executable installation file including a second portion that is not used to generate the digital signature; and
dynamically incorporating the data file comprises dynamically incorporating the data file in the second portion of the executable installation file.

3. The computer-implemented method of claim 1, wherein the specific network resource location is a location associated with a specific Uniform Resource Locator.

4. The computer-implemented method of claim 1, wherein obtaining the executable installation file comprises obtaining an executable installation file for a most current version of the web browser.

5. The computer-implemented method of claim 1, wherein dynamically incorporating the data file comprises:
  obtaining a definition of a most current version of the defined browser extension; and
  incorporating a data file including the obtained definition.

6. The computer-implemented method of claim 1, wherein the executable installation file, with the incorporated data file, is further configured to, when executed on the computing device, establish one or more operational settings of the web browser.

7. The computer-implemented method of claim 6, wherein the one or more operational settings include at least one of:
  a setting that causes the web browser to periodically check for and install updates to the web browser; and
  a setting that causes the web browser to periodically check for and install updates to the defined browser extension.

8. The computer-implemented method of claim 1, wherein the browser extension definition includes a unique identifier of the browser extension, the unique identifier being stored in an encoding scheme that does not use numeric characters.

9. The computer-implemented method of claim 1, wherein the browser extension definition includes a unique identifier of the browser extension, the unique identifier comprising a sub-portion of a cryptographic hash value generated from a public encryption key portion of a public/private encryption key pair.

10. The computer-implemented method of claim 1, wherein obtaining the executable installation file comprises obtaining the executable installation file from a network resource location other than the specific network resource location.

11. The computer-implemented method of claim 1, wherein the browser extension definition includes a network resource location at which the defined browser extension is located, the executable installation file, with the incorporated data file, being further configured to, when executed on the computing device, cause the computing device to obtain the defined browser extension included in the browser extension definition.

12. The computer-implemented method of claim 1, wherein the data file further includes a second browser extension definition, the executable installation file, with the incorporated data file, being further configured to, when executed on the computing device, install the second browser extension on the computing device.

13. A non-transitory recordable storage medium having recorded and stored thereon instructions that, when executed by a first computing device, cause the first computing device to:
  receive, at the first computing device, a request from a second computing device for an executable installation file, the executable installation file being configured, when executed on the second computing device, to install a web browser on the second computing device, the request being associated with a specific network resource location that is hosted by the first computing device; and
  in response to receiving the request:
    obtain the executable installation file;
    dynamically incorporate a data file into the executable installation file, the data file including a browser extension definition for a browser extension corresponding with the specific network resource location, wherein the executable installation file, with the incorporated data file, is further configured, when executed on the second computing device, to install the defined browser extension on the second computing device; and
    provide the executable installation file, with the incorporated data file, to the second computing device.

14. The non-transitory recordable storage medium of claim 13, wherein the instructions that cause the first computing device to obtain the executable installation file comprise instructions that cause the first computing device to obtain an executable installation file for a most current version of the web browser.

15. The non-transitory recordable storage medium of claim 13, wherein the instructions that cause the first computing device to dynamically incorporate the data file comprise instructions that cause the first computing device to:
  obtain a definition of a most current version of the defined browser extension; and
  incorporate a data file including the obtained definition.

16. The non-transitory recordable storage medium of claim 13, wherein the browser extension definition includes a unique identifier of the browser extension, the unique identifier comprising a sub-portion of a cryptographic hash value generated from a public encryption key portion of a public/private encryption key pair.

17. The non-transitory recordable storage medium of claim 13, wherein the instructions that cause the first computing device to obtain the executable installation file comprise instructions that cause the first computing device to obtain the executable installation file from a network resource location other than the specific network resource location.

18. The non-transitory recordable storage medium of claim 13, wherein the browser extension definition includes a network resource location at which the defined browser extension is located.

19. The non-transitory recordable storage medium of claim 13, wherein the data file further includes a second browser extension definition, the executable installation file, with the incorporated data file, being further configured to, when executed on the second computing device, install the second browser extension on the second computing device.

20. An apparatus comprising:
   a processor; and
   a non-transitory recordable storage medium having instructions recorded thereon, wherein, the apparatus is configured, as result of executing the instructions, to:
      receive, at a server, a request from a computing device for an executable installation file, the executable installation file being configured, when executed on the computing device, to install a web browser on the computing device, the request being associated with a specific network resource location that is hosted by the server; and
   in response to receiving the request:
      obtain the executable installation file;
      dynamically incorporate a data file into the executable installation file, the data file including a browser extension definition for a browser extension corresponding with the specific network resource location, wherein the executable installation file, with the incorporated data file, is further configured, when executed on the computing device, to install the defined browser extension on the computing device; and
      provide the executable installation file, with the incorporated data file, to the computing device.

21. The apparatus of claim 20, wherein the data file further includes a second browser extension definition, the executable installation file, with the incorporated data file, being further configured to, when executed on the computing device, install the second browser extension on the computing device.

* * * * *